US009725166B2

(12) United States Patent
Baskin et al.

(10) Patent No.: US 9,725,166 B2
(45) Date of Patent: Aug. 8, 2017

(54) COUNTER-ROTATING ROTOR SYSTEM WITH STATIC MAST

(71) Applicant: Sikorsky Aircraft Corporation, Stratford, CT (US)

(72) Inventors: Bryan Kenneth Baskin, Arlington, TX (US); Todd A. Garcia, Mansfield, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 654 days.

(21) Appl. No.: 14/081,300

(22) Filed: Nov. 15, 2013

(65) Prior Publication Data

US 2015/0139799 A1 May 21, 2015

(51) Int. Cl.
*B64C 27/10* (2006.01)
*B64C 27/59* (2006.01)

(52) U.S. Cl.
CPC ............. *B64C 27/10* (2013.01); *B64C 27/59* (2013.01)

(58) Field of Classification Search
CPC ......... B64C 27/10; B64C 27/12; B64C 27/59; B64C 27/08; B64C 27/52
See application file for complete search history.

(56) References Cited

U.S. PATENT DOCUMENTS

| 3,409,249 A * | 11/1968 | Bergquist | ................ B64C 27/10 244/17.13 |
| 4,531,692 A * | 7/1985 | Mateus | ................... B64C 27/10 244/17.19 |
| 4,573,873 A | 3/1986 | Yao et al. | |
| 4,730,795 A * | 3/1988 | David | ..................... B64C 27/22 244/17.21 |
| 5,154,371 A | 10/1992 | Grant et al. | |
| 5,351,913 A | 10/1994 | Cycon et al. | |
| 5,791,592 A * | 8/1998 | Nolan | ..................... B64C 27/14 244/17.11 |
| 6,102,659 A | 8/2000 | Rampal | |
| 6,293,492 B1 | 9/2001 | Yanagisawa | |

(Continued)

FOREIGN PATENT DOCUMENTS

| EP | 1990275 B1 | 4/2011 |
| FR | 2406565 | 10/1978 |

OTHER PUBLICATIONS

EP Search Report; Application No. 14191856.5-1754; Dated Apr. 21, 2015; 5 pages.

*Primary Examiner* — Gregory Anderson
*Assistant Examiner* — Maxime Adjagbe
(74) *Attorney, Agent, or Firm* — Cantor Colburn LLP

(57) ABSTRACT

A coaxial, dual rotor system includes a first rotor assembly positioned at a rotor axis. A first rotor quill shaft is operably connected to the first rotor assembly at the rotor axis to drive rotation of the first rotor assembly about the rotor axis. A nonrotating static mast extends along the rotor axis through the first rotor quill shaft. A second rotor assembly is positioned at the rotor axis. A second rotor quill shaft is operably connected to the second rotor assembly to drive rotation of the second rotor assembly about the rotor axis. The second rotor quill shaft is coaxial with the first rotor quill shaft and disposed inside of the static mast. A second rotor bearing is positioned between the second rotor assembly and the static mast to transfer loads from the second rotor assembly to the static mast.

20 Claims, 4 Drawing Sheets

(56) References Cited

U.S. PATENT DOCUMENTS

| | | |
|---|---|---|
| 7,118,340 B2 | 10/2006 | D'Anna |
| 7,530,787 B2 | 5/2009 | Bertolotti et al. |
| 2006/0269411 A1 | 11/2006 | Bertolotti et al. |
| 2007/0181741 A1* | 8/2007 | Darrow, Jr. ............... B64C 1/00 244/17.23 |

* cited by examiner

COUNTER-ROTATING ROTOR SYSTEM WITH STATIC MAST

BACKGROUND

The subject matter disclosed herein relates to the art of rotary wing aircraft and, more specifically, to coaxial multi-rotor systems for rotary wing aircraft.

In typical rotary winged aircraft, for example, helicopters with dual coaxial rotor systems, rotary power is transmitted from an engine through a gearbox into the rotor system. The gearbox transfers power to a lower rotor shaft to drive a lower rotor assembly and to an upper rotor shaft coaxial with the lower rotor shaft to drive the upper rotor assembly. The systems typically include several sets of bearings between the upper rotor shaft and lower rotor shaft to transfer loads between the shafts. The bearings and controls for the upper rotor assembly drive an increased diameter for the upper rotor shaft, and thus the lower rotor shaft, which increases drag during operation. As such, many coaxial rotor systems include an aerodynamic fairing positioned between the upper rotor assembly and the lower rotor assembly. Typical systems attach to the upper and lower rotor shafts, and include a significant derotation mechanism to prevent the fairing from rotating, and to keep the fairing oriented in a selected direction.

BRIEF DESCRIPTION

In one embodiment, a coaxial, dual rotor system includes a first rotor assembly positioned at a rotor axis. A first rotor quill shaft is operably connected to the first rotor assembly at the rotor axis to drive rotation of the first rotor assembly about the rotor axis. A nonrotating static mast extends along the rotor axis inside of the first rotor quill shaft. A second rotor assembly is positioned at the rotor axis. A second rotor quill shaft is operably connected to the second rotor assembly to drive rotation of the second rotor assembly about the rotor axis. The second rotor quill shaft is coaxial with the first rotor quill shaft and disposed inside of the static mast. A second rotor bearing set is positioned between the second rotor assembly and the static mast to transfer loads from the second rotor assembly to the static mast.

In another embodiment, a dual coaxial rotor rotorcraft includes an airframe; a drive system positioned at the airframe and a coaxial, dual rotor system operably connected to the drive system. The rotor system includes a first rotor assembly positioned at a rotor axis. A first rotor quill shaft is operably connected to the first rotor assembly at the rotor axis to drive rotation of the first rotor assembly about the rotor axis. A nonrotating static mast extends along the rotor axis inside of the first rotor quill shaft. A second rotor assembly is positioned at the rotor axis. A second rotor quill shaft is operably connected to the second rotor assembly to drive rotation of the second rotor assembly about the rotor axis. The second rotor quill shaft is coaxial with the first rotor quill shaft and disposed inside of the static mast. A second rotor bearing is positioned between the second rotor assembly and the static mast to transfer loads from the second rotor assembly to the static mast.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
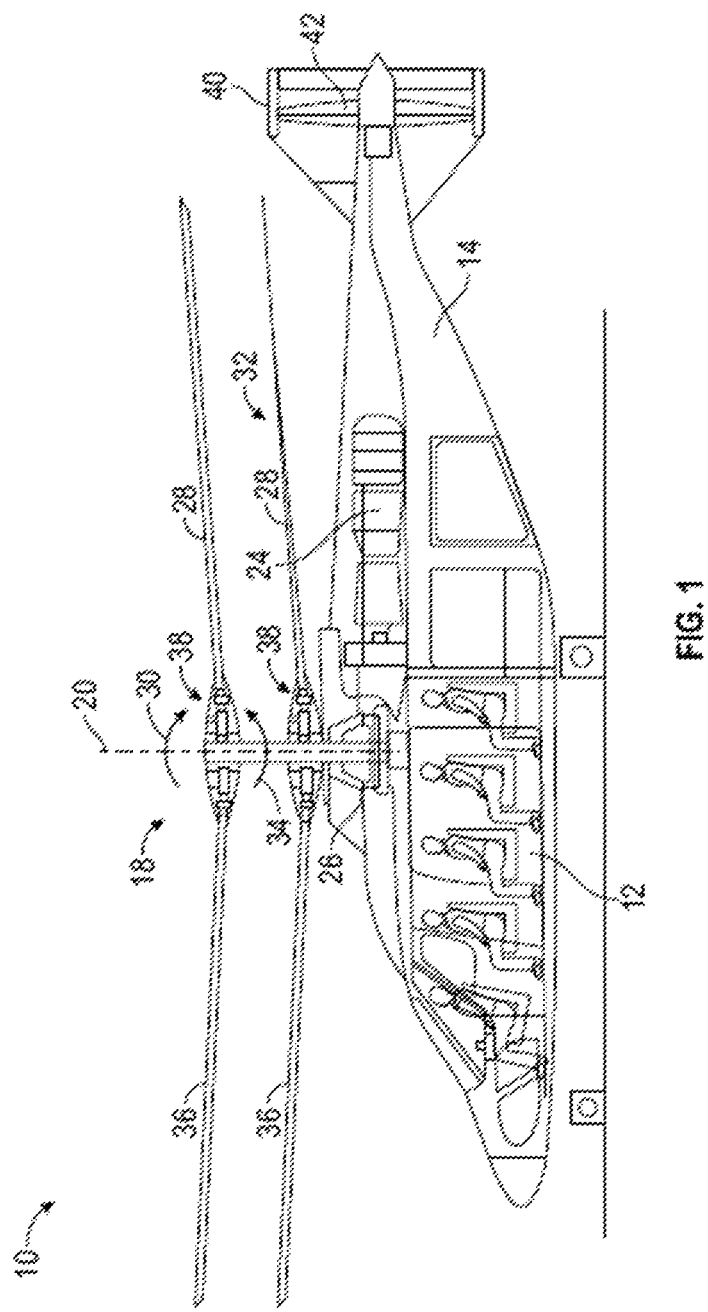
FIG. 1 is a schematic view of an embodiment of a rotary wing aircraft.

Shown in FIG. 1 is schematic view of an embodiment of a rotary wing aircraft, in this embodiment a helicopter 10. The helicopter 10 includes an airframe 12 with an extending tail 14. A dual, counter rotating coaxial main rotor assembly 18 is located at the airframe 12 and rotates about a main rotor axis 20. The main rotor assembly 18 is driven by a power source, for example, an engine 24 via a gearbox 26. The main rotor assembly 18 includes an upper rotor assembly 28 driven in a first direction 30 about the main rotor axis 20, and a lower rotor assembly 32 driven in a second direction 34 about the main rotor axis 20, opposite to the first direction 30. While, in FIG. 1, the first direction 30 is illustrated as counter-clockwise and the second direction 34 is illustrated as clockwise, it is to be appreciated that in some embodiments the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the helicopter 10 further includes a translational thrust system 40 located at the extending tail 14 to provide translational thrust for the helicopter 10. The translational thrust system 40 includes a propeller rotor 42 connected to and driven by the engine 24 via the gearbox 26. While shown in the context of a pusher-prop configuration, it is understood that the propeller rotor 42 could also be more conventional puller prop or could be variably facing so as to provide yaw control in addition to or instead of translational thrust.

Figure 2:
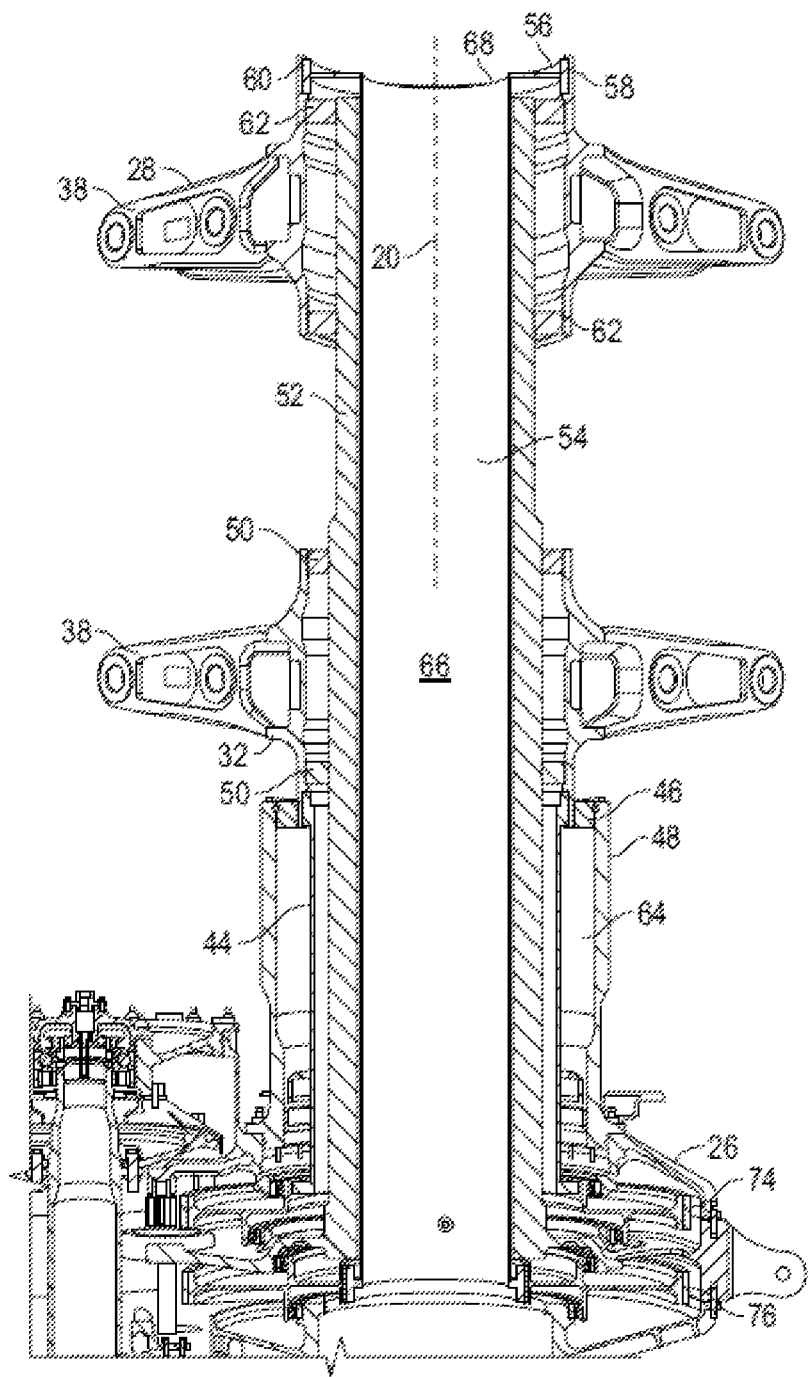
FIG. 2 is a cross-sectional view of an embodiment of a dual coaxial rotor system.

Referring to FIG. 2, the lower rotor assembly 32 is driven by a lower rotor quill shaft 44 operably connected to the gearbox 26 at lower rotor bull gear 74 to drive the lower rotor assembly 32 in the second direction 34. The lower rotor assembly 32 is connected to the lower rotor quill shaft 44 via, for example, a lower rotor spline connection 46. The lower rotor quill shaft 44 carries torque loads of driving the lower rotor assembly 32, while remaining lower rotor loads, such as thrust, shear and head moment, are transferred to a nonrotating static mast 52 through lower rotor bearings 50. The static mast 52 is secured to the gearbox 26 and extends along the main rotor axis 20 through the lower rotor quill shaft 44 and through the upper rotor assembly 28. An upper rotor quill shaft 54 extends along the main rotor axis 20 through an interior of the static mast 52. The upper rotor assembly 28 is operably connected to the gearbox 26 via the upper rotor quill shaft 54 at upper rotor bull gear 76 to drive rotation of the upper rotor assembly 28 in the first direction 30. While the gearbox 26 in the present embodiment includes bull gears 48 and 56, it is merely exemplary. Other gear types, such as spiral bevel gears, may be utilized.

Figure 3:
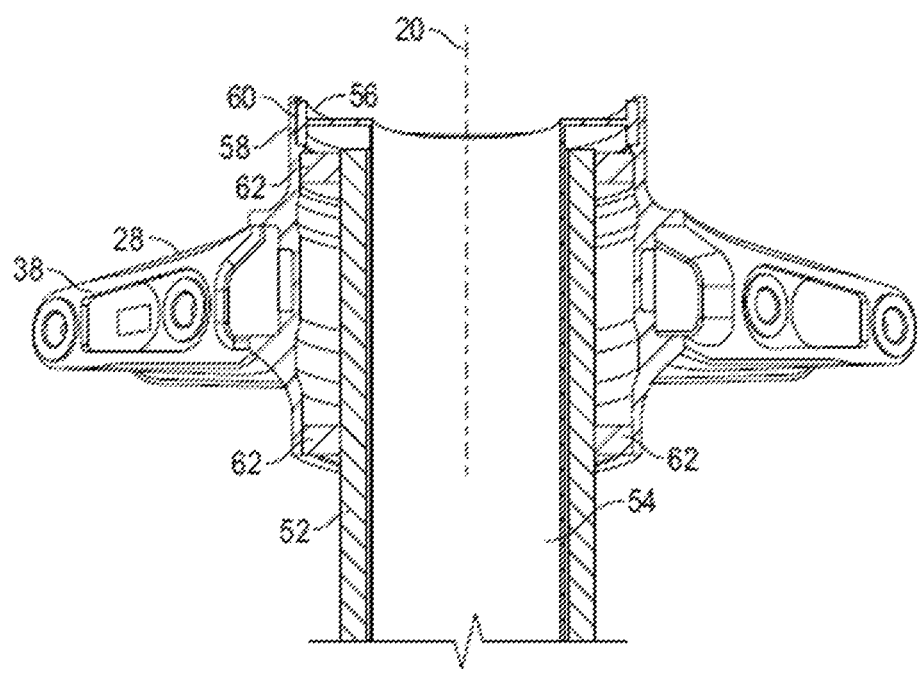
FIG. 3 is a cross-sectional view of an embodiment of an upper rotor shaft connection to an upper rotor assembly.

Referring to FIG. 3, to connect the upper rotor quill shaft 54 to the upper rotor assembly 28, the upper rotor quill shaft 54 includes an upper shaft flange 56 extending over an upper end 58 of the static mast 52 to the upper rotor assembly 28. At the upper rotor assembly 28, the upper shaft flange 56 is connected to the upper rotor assembly 28 by, for example, an upper rotor spline connection 60. While the upper rotor quill shaft 54 transmits torque loads for driving the upper rotor assembly 28, other upper rotor flight loads such as thrust, shear and head moment, are transferred from the upper rotor assembly 28 into the static mast 52 via upper rotor bearings 62 located between the upper rotor assembly 28 and the static mast 52. The loads are then transferred to the gearbox 26 via the fixed connection of the static mast 52 to the gearbox 26.

Referring again to FIG. 2, in some embodiments, controls for the lower rotor assembly 32, such as control rods, hydraulic lines, electrical leads (not shown in FIG. 2) or other controls are conventionally routed outside of the gearbox housing 48 and lower rotor quill shaft 44. In other embodiments such controls could be partially routed through and enclosed in a lower rotor cavity 64 between the gearbox housing 48 and the lower rotor quill shaft 44. Similarly, in some embodiments, controls for the upper rotor assembly 28 are routed through an upper rotor quill shaft interior 66 and connected to the upper rotor assembly 28 through an upper shaft opening 68 at an end of the upper rotor quill shaft 54.

Figure 4:
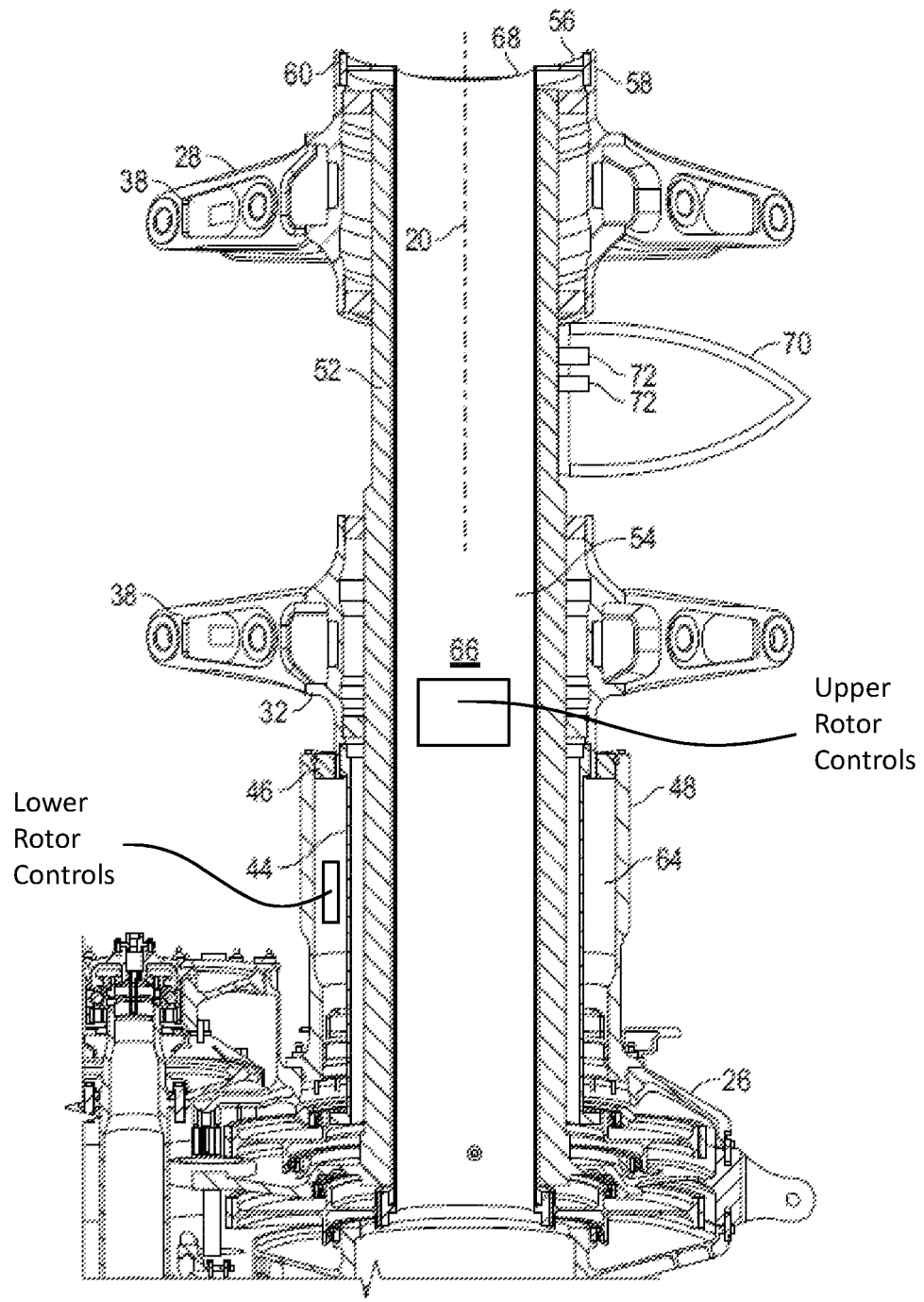
FIG. 4 is another embodiment of a dual coaxial rotor system.

Referring now to FIG. 4, the static mast 52 provides a nonrotating structure at which to mount an aerodynamic fairing 70 between the upper rotor assembly 28 and the lower rotor assembly 32. To facilitate installation of the fairing 70, the static mast 52 may include, for example, an arrangement of studs or bolts 72, which align with openings (not shown) in the fairing 70 and are used to secure the fairing 70 to the static mast 52. While in the embodiment shown, a fairing 70 is installed on static mast 52, it is to be appreciated that the static mast 52 may be utilized to locate and secure various nonrotating elements, such as radar domes, slip rings, lidar equipment, and the like. Further, while illustrated as empty, is to be appreciated that the fairing 70 may be solid or house components such as electronics of the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies, turbines, and/or fans. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A coaxial, dual rotor system comprising:
   a first rotor assembly disposed at a rotor axis;
   a first rotor quill shaft operably connected to the first rotor assembly at the rotor axis to drive rotation of the first rotor assembly about the rotor axis;
   a non-rotating static mast extending along the rotor axis inside of the first rotor quill shaft;
   a second rotor assembly disposed at the rotor axis;
   a second rotor quill shaft operably connected to the second rotor assembly to drive rotation of the second rotor assembly about the rotor axis, the second rotor quill shaft coaxial with the first rotor quill shaft and disposed inside of the static mast, wherein the second rotor assembly is mounted concentrically with the second rotor quill shaft and the non-rotating static mast, the non-rotating static mast extending from the first rotor assembly to the second rotor assembly; and
   a rotor bearing disposed between the second rotor assembly and the static mast to transfer loads from the second rotor assembly to the static mast.

2. The rotor system of claim 1, wherein the second rotor quill shaft includes a flange extending from the second rotor quill shaft to connect the second rotor quill shaft to the second rotor assembly.

3. The rotor system of claim 1, wherein the static mast extends axially through the first rotor assembly and the second rotor assembly.

4. The rotor system of claim 1, wherein the second rotor quill shaft extends beyond an axial extend of the static mast.

5. The rotor system of claim 1, further comprising an aerodynamic fairing secured to the static mast between the first rotor assembly and the second rotor assembly.

6. The rotor system of claim 5, wherein the aerodynamic fairing is secured to the static mast via a plurality of fasteners extending from the static mast.

7. The rotor system of claim 1, wherein the static mast is secured to a gearbox.

8. The rotor system of claim 1, further comprising another rotor bearing disposed between the first rotor assembly and a gearbox housing to transfer loads from the first rotor assembly to the gearbox housing.

9. The rotor system of claim 1, wherein controls for the first rotor assembly are routed between the first rotor quill shaft and a gearbox housing.

10. The rotor system of claim 1, wherein controls for the second rotor assembly are routed through an interior of the second rotor quill shaft.

11. A dual coaxial rotor rotorcraft comprising:
    an airframe;
    a drive system disposed at the airframe; and
    a coaxial, dual rotor system operably connected to the drive system including:
    a first rotor assembly disposed at a rotor axis;
    a first rotor quill shaft operably connected to the first rotor assembly at the rotor axis to drive rotation of the first rotor assembly about the rotor axis;
    a non-rotating static mast extending along the rotor axis inside of the first rotor quill shaft;
    a second rotor assembly disposed at the rotor axis;
    a second rotor quill shaft operably connected to the second rotor assembly to drive rotation of the second rotor assembly about the rotor axis, the second rotor quill shaft coaxial with the first rotor quill shaft and disposed inside of the static mast, wherein the second rotor assembly, is mounted concentrically with the second rotor quill shaft and the non-rotating static mast, the non-rotating static mast extending from the first rotor assembly to the second rotor assembly; and
    a rotor bearing disposed between the second rotor assembly and the static mast to transfer loads from the second rotor assembly to the static mast .

12. The rotorcraft of claim 11, wherein the second rotor quill shaft includes a shaft flange extending from the second rotor quill shaft to connect the second rotor quill shaft to the second rotor assembly.

13. The rotorcraft of claim 11, wherein the static mast extends axially through the first rotor assembly and the second rotor assembly.

14. The rotorcraft of claim 11, wherein the second rotor quill shaft extends beyond an axial extend of the static mast.

15. The rotorcraft of claim 12, further comprising an aerodynamic fairing secured to the static mast between the first rotor assembly and the second rotor assembly.

16. The rotorcraft of claim 15, wherein the aerodynamic fairing is secured to the static mast via a plurality of fasteners extending from the static mast.

17. The rotorcraft of claim 11, wherein the static mast is secured to a gearbox of the drive system.

18. The rotorcraft of claim 11, further comprising another rotor bearing disposed between the first rotor assembly and a gearbox housing to transfer loads from the first rotor assembly to the gearbox housing.

19. The rotorcraft of claim 11, wherein controls for the first rotor assembly are routed between the first rotor quill shaft and a gearbox housing.

20. The rotorcraft of claim 11, wherein controls for the second rotor assembly are routed through an interior of the second rotor quill shaft.

\* \* \* \* \*